US 9,406,345 B2

(12) United States Patent
Yang et al.

(10) Patent No.: US 9,406,345 B2
(45) Date of Patent: Aug. 2, 2016

(54) HORIZONTAL COUPLING OF VERTICALLY-ORIENTED HARD DRIVE

(71) Applicant: Quanta Computer Inc., Tao Yuan Shien (TW)

(72) Inventors: Wei-Chih Yang, Tao Yuan Shien (TW); Chao-Jung Chen, Tao Yuan Shien (TW); Chih-Wei Lin, Tao Yuan Shien (TW)

(73) Assignee: Quanta Computer Inc., Tao Yuan Shien (TW)

( * ) Notice: Subject to any disclaimer, the term of this patent is extended or adjusted under 35 U.S.C. 154(b) by 0 days.

(21) Appl. No.: 14/542,080

(22) Filed: Nov. 14, 2014

(65) Prior Publication Data

US 2016/0042768 A1 Feb. 11, 2016

(30) Foreign Application Priority Data

Aug. 5, 2014 (TW) .............................. 103126781 A

(51) Int. Cl.
*F16D 1/00* (2006.01)
*G11B 33/00* (2006.01)
(Continued)

(52) U.S. Cl.
CPC .............. *G11B 33/005* (2013.01); *G06F 1/187* (2013.01); *G11B 33/124* (2013.01); *G11B 33/128* (2013.01); *Y10T 403/59* (2015.01)

(58) Field of Classification Search
CPC ... H05K 5/0221; H05K 5/023; H05K 5/0269; H05K 5/0295; Y10T 403/59; Y10T 403/591; Y10T 403/593; Y10T 403/595; Y10T 403/597; Y10T 403/589; Y10T 403/599; Y10T 403/60; Y10T 403/602; Y10T 403/604606; Y10T 403/33; G11B 33/005; G11B 33/124; G11B 33/128; G06F 1/187

USPC ........ 403/321, 322.1, 322.3, 322.4, 323, 324, 403/325, 326–330
See application file for complete search history.

(56) References Cited

U.S. PATENT DOCUMENTS 5,557,499 A 9/1996 Reiter et al.
5,680,293 A * 10/1997 McAnally ............ G11B 33/124
248/220.22

(Continued)

FOREIGN PATENT DOCUMENTS

GB 2137819 4/1983
TW 201305774 A1 2/2013

OTHER PUBLICATIONS

Oracle, "Server HDD Replacement: 3.7.1.4 Replace an Existing HDD or SSD", Retrieved on Dec. 3, 2014, from: https://docs.oracle.com/cd/E19474-01/E21604/maintenance14.html#50417682_33139. (34 pages).

(Continued)

*Primary Examiner* — Gregory Binda
*Assistant Examiner* — Nahid Amiri
(74) *Attorney, Agent, or Firm* — Polsinelli PC

(57) ABSTRACT

An apparatus adapted to house a component oriented in a first direction used for facilitating insertion and removal of the component in a second direction to/from a chassis, the first direction orthogonal to the second direction. The apparatus can be a caddy with an attached pivoting handle. Pivoting the handle in the first direction down towards the caddy causes the hard drive to slide in the second direction to couple with a hard drive coupling on the chassis. In some implementations, the caddy houses a hard drive in a vertical orientation, such that multiple hard drives can be coupled side-by-side to each other. In some implementations, the caddy is removably attached to the chassis. The chassis can comprise a rail, and the handle can comprise a hook. The hook attaches to the rail forming a removable attachment that allows for easy removal and insertion of the caddy.

6 Claims, 4 Drawing Sheets

(51) Int. Cl.
  *G06F 1/18* (2006.01)
  *G11B 33/12* (2006.01)

(56) References Cited

U.S. PATENT DOCUMENTS

| | | | |
|---|---|---|---|
| 5,751,551 | A | 5/1998 | Hileman et al. |
| 6,175,999 | B1 | 1/2001 | Sloan et al. |
| 6,236,563 | B1 * | 5/2001 | Buican ............... G06F 1/184 312/333 |
| 6,490,153 | B1 * | 12/2002 | Casebolt et al. ......... 361/679.33 |
| 6,580,603 | B1 | 6/2003 | Resnick |
| 6,854,174 | B2 * | 2/2005 | Jiang ..................... 29/603.1 |
| 6,878,006 | B1 * | 4/2005 | Heidenreich et al. ......... 439/352 |
| 7,092,250 | B2 * | 8/2006 | Chen et al. ............... 361/679.35 |
| 7,139,166 | B2 * | 11/2006 | Marcade et al. ......... 361/679.32 |
| 7,477,511 | B2 * | 1/2009 | Hsu et al. ................ 361/679.37 |
| 7,480,137 | B1 | 1/2009 | Jyh et al. |
| 7,782,606 | B2 * | 8/2010 | Baker et al. ............. 361/679.39 |
| 7,903,401 | B2 | 3/2011 | Lee et al. |
| 8,023,263 | B2 | 9/2011 | Crippen et al. |
| 8,248,775 | B2 | 8/2012 | Zhang et al. |
| 8,369,080 | B2 | 2/2013 | Huang et al. |
| 8,553,404 | B2 | 10/2013 | Lin et al. |
| 8,743,536 | B2 | 6/2014 | Alo et al. |
| 2004/0047128 | A1 | 3/2004 | McClelland et al. |
| 2006/0012965 | A1 | 1/2006 | Beall et al. |
| 2007/0206351 | A1 | 9/2007 | Szelong et al. |
| 2010/0134987 | A1 | 6/2010 | Fuerholzer |
| 2013/0037677 | A1 * | 2/2013 | Bohanan ............ B63B 35/7946 248/316.5 |
| 2013/0099640 | A1 | 4/2013 | Hu et al. |

OTHER PUBLICATIONS

Startech, "Trayless SATA drive bay: 5.25" Trayless SATA Hot Swap Drive Bay", Retrieved from: http://images10.newegg.com/User-Manual/User_Manual_17-998-020.pdf (Sep. 27, 2006). (9 pages).
Office Action mailed on Jul. 24, 2015 in Taiwanese Application No. 103126781.
English Abstract of Taiwanese Publication No. TW 201305774.
Summary of Office Action mailed on Jul. 24, 2015 in Taiwanese Application No. 103126781.
Extended European Search Report mailed on Nov. 9, 2015 in European Application No. 15163731.1.

* cited by examiner

HORIZONTAL COUPLING OF VERTICALLY-ORIENTED HARD DRIVE

TECHNICAL FIELD

The disclosure generally relates to a hard drive caddy for facilitating coupling of a hard drive to a hard drive coupling.

BACKGROUND

Conventionally, hard drive caddies can facilitate coupling of a hard drive to a hard drive coupling. For example, a hard drive caddy can be adapted to house a hard drive in a horizontal orientation to allow the hard drive to slide into a coupling that connects the hard drive to a motherboard. The hard drive caddy can further comprise a lever or a handle used for removal or insertion of the hard drive. However, in a system requiring multiple hard drives, such as a server, horizontally orienting the hard drives takes up a lot of space in a server, requiring each hard drive to have its own shelf and to be stacked on top of each other, which leads to issues of heat dissipation as well.

Vertically-oriented hard drives are configured to sit on top of the coupling that connects the hard drive to the motherboard. For example, a vertically-oriented hard drive can have a female coupling on the bottom of the hard drive that connects to a male coupling attached to the motherboard. When the vertically-oriented hard drive is placed on top of the male coupling a connection between the hard drive and motherboard is established. However, when set on top of the hard drive to motherboard coupling, vertically oriented hard drives place a lot of stress on the coupling making the coupling prone to failures.

SUMMARY

In some implementations, an apparatus adapted to house a vertically-oriented hard drive is used to facilitate insertion and removal of the hard drive in a horizontal direction to/from a chassis (e.g. motherboard). For example, the apparatus can be a hard drive caddy with an attached pivoting handle. Pivoting the handle in a vertical direction down towards the caddy causes the hard drive to slide horizontally to couple with a hard drive coupling on the chassis. In some implementations, the hard drive caddy houses the hard drive in a vertical orientation, such that multiple hard drives can be coupled side-by-side to each other, saving space on the chassis. In some implementations, the hard drive caddy is removably attached to the chassis. For example, the chassis can comprise a rail, and the handle can comprise a hook. The hook attaches to the rail forming a removable attachment that allows for easy removal and insertion of the hard drive caddy.

Particular implementations provide at least the following advantages: A hard drive can be coupled to a hard drive coupling while in a vertical orientation, allowing for space to be saved in the chassis; easy insertion and removal of a hard drive to/from the chassis.

Details of one or more implementations are set forth in the accompanying drawings and the description below. Other features, aspects, and potential advantages will be apparent from the description and drawings, and from the claims.

DESCRIPTION OF DRAWINGS

Like reference symbols in the various drawings indicate like elements.

DETAILED DESCRIPTION

Figure 1:
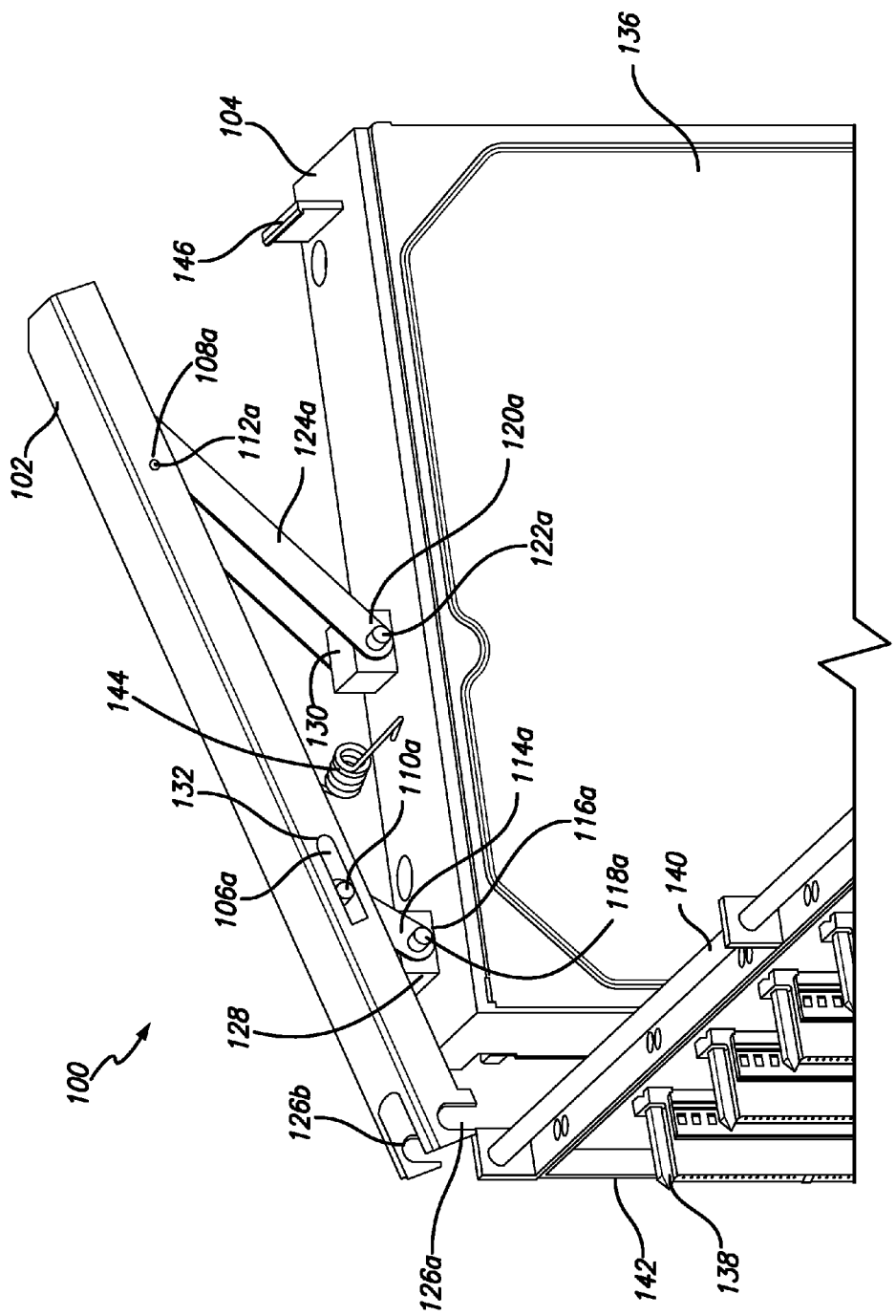
FIG. 1 is an isometric view of a hard drive carrier apparatus.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and members have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented.

The term "coupled" is defined as connected, whether directly or indirectly through intervening members, and is not necessarily limited to physical connections. The connection can be such that the objects are permanently connected or releasably connected. The term "substantially" is defined to be essentially conforming to the particular dimension, shape or other word that substantially modifies, such that the member need not be exact. For example, substantially cylindrical means that the object resembles a cylinder, but can have one or more deviations from a true cylinder. The term "comprising," when utilized, means "including, but not necessarily limited to"; it specifically indicates open-ended inclusion or membership in the so-described combination, group, series and the like.

FIG. 1 illustrates an example hard drive carrier 100 for facilitating coupling in a first direction of a component oriented in a second direction. The first direction can be orthogonal to the second direction. In some implementations, the first direction can be horizontal and the second direction can be vertical, and vice versa. In some implementations, handle 102 can be used to lower hard drive carrier 100 into hard drive drawer 150 for installing hard drive 136 into chassis 142 (e.g. a motherboard or server chassis). Hard drive drawer 150 can be adapted to house multiple hard drive carriers in a side-by-side configuration. Alternatively, hard drive drawer 150 can be configured to open and close similar to a cabinet drawer, wherein opening hard drive drawer 150 exposes the hard drives, and closing hard drive drawer 150 stores the hard drives in a storage space (e.g. a server tower).

In some implementations, handle 102 can be used to horizontally slide hard drive 136 into place. This is accomplished by pivotally attaching handle 102 to hard drive frame 104. For example, handle 102 can comprise first pivot point 106a and second pivot point 108a. First pivot point 106a comprises first pivot joint 110a, and second pivot point 108a comprises second pivot joint 112a. First pivot joint 110a connects first pivot bar 114a to third pivot point 116a comprising third pivot joint 118a. Second pivot joint 112a connects second pivot bar 124*a* to fourth pivot point 120*a* comprising fourth pivot joint 122*a*. In some implementations, first, second, third, and fourth pivot points 106*a*, 108*a*, 116*a*, and 120*a* each have corresponding pivot points 106*b*, 108*b*, 116*b*, and 120*b* (shown in FIG. 2). In some implementations, first, second, third, and fourth pivot joints 110*a*, 112*a*, 118*a*, and 122*a* each have corresponding pivot joints 110*b*, 112*b*, 118*b*, 122*b* (shown in FIG. 2). In some implementations first and second pivot bars 114*a* and 124*a* each have corresponding pivot bars 114*b* and 124*b* (shown in FIG. 2). In some implementations, the pivot joints can be any pivot joints known in the art, including, but not limited to, ball and socket joint, condyloid joint (ellipsoid), saddle joint, hinge joint, pivot joint, etc.

Figure 3:
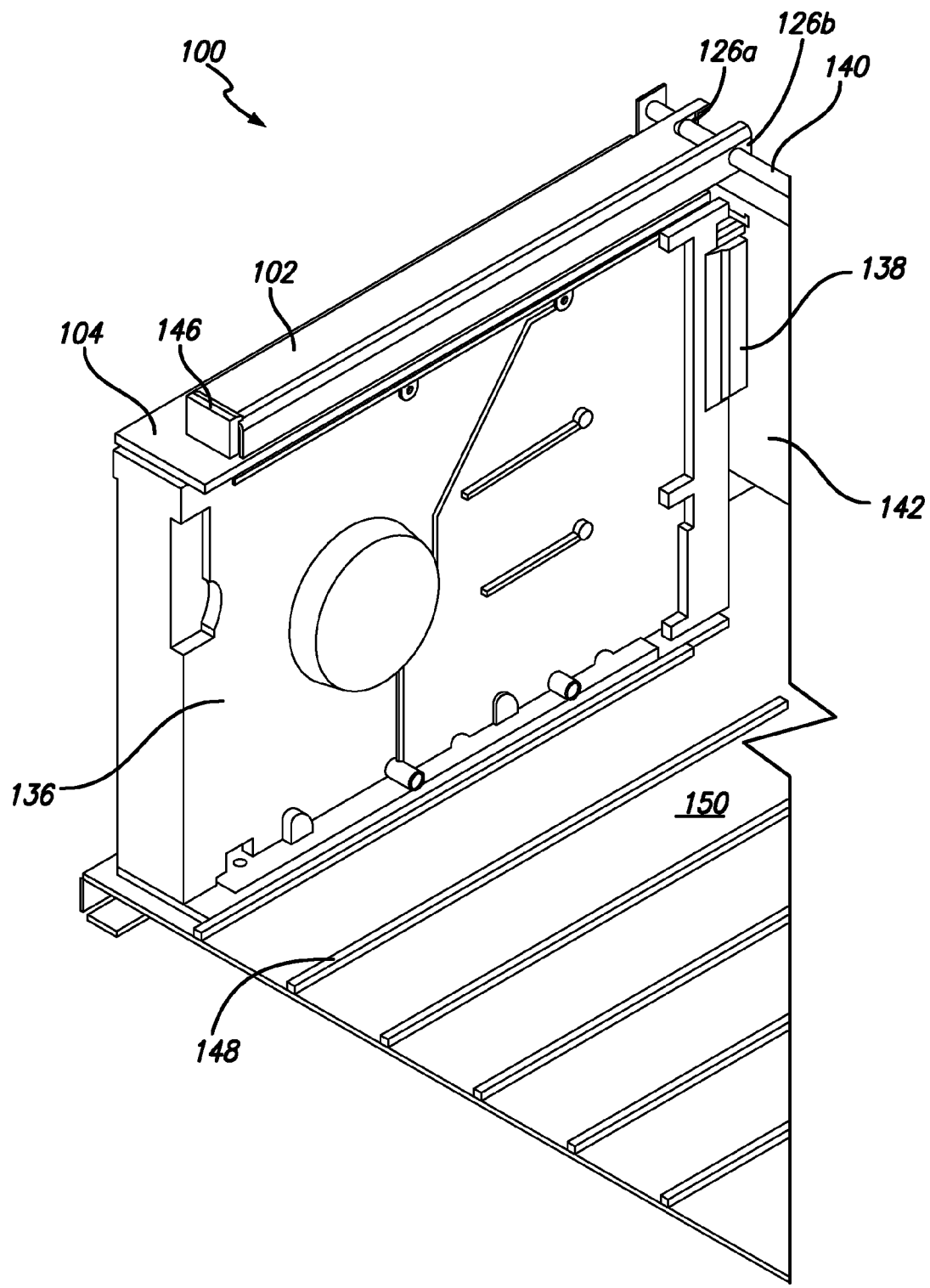
FIG. 3 is an alternate view of the apparatus of FIG. 1 showing the hard drive carrier secured in place.

In some implementations, first pivot joints 110*a* and 110*b* are adapted to slide along first and second windows 132 and 134 located on handle 102 to allow first pivot points 106*a* and 106*b* to slide while handle 102 is pivoted. For example, while handle 102 is pivoted down towards hard drive frame 104, pivot joints 110*a* and 100*b* slide from one side of windows 132 and 134 to an opposite side of windows 132 and 134. In some implementations first pivot bars 114*a* and 114*b* are shorter than second pivot bars 124*a* and 124*b*. For example, having shorter first pivot bars 114*a* and 114*b* allows handle 102 to pivot down such that it lies completely flat against the top of hard drive frame 104 while hard drive 136 is coupled to coupling 138. The pivot bars can be any shape, including, but not limited to, rectangular, ovular, rod-shaped, etc. Alternatively, the pivot bars can be adapted to be covered by handle 102 when handle 102 lies completely flat against hard drive frame 104 (as shown in FIG. 3). In some implementations, coupling 138 can be any standard hard drive coupling known in the art, including, but not limited to, SATA, PATA, IDE, etc.

In some implementations, handle 102 comprises hooks 126*a* and 126*b*. For example, handle 102 can be hollow and rectangular in shape, with hooks 126*a* and 126*b* located on opposing sides of the rectangle. Additionally, first and second pivot joints 110*a*, 110*b*, 112*a*, 112*b* and pivot points 106*a*, 106*b*, 108*a*, 108*b* can be located on opposing sides of the rectangle as well. In some implementations, hooks 126*a* and 126*b* can be two U-shaped recesses located on handle 102. For example, hooks 126*a* and 126 can be removably attached to rail 140. Alternatively, hooks 126*a* and 126*b* can be adapted to snap securely into place on rail 142 according to methods known in the art, such as friction fit, using latches, etc.

In some implementations, hard drive frame 104 can comprise first and second pivot boxes 128 and 130 for facilitating pivoting motion of handle 102 towards and away from hard drive frame 104. Pivot boxes 128 and 130 can be substantially rectangular in shape. Alternatively, pivot boxes 128 and 130 can be round in shape. In some implementations, pivot points and pivot joints 116*a*, 116*b*, 120*a*, 120*b*, 118*a*, 118*b*, 122*a*, and 122*b* can be located on opposing sides of pivot boxes 128 and 130.

In some implementations, rail 140 is attached to chassis 142 (e.g. a server chassis). For example, rail 140 can be longitudinal in shape and span across the top of chassis 142. Rail 140 can be shaped to be coupled with hooks 126*a* and 126*b* such that hard drive carrier 100 can be removably attached to chassis 142. Rail 140 can also be shaped to allow handle 102 to pivot when hooks 126*a* and 126*b* are engaged with rail 140. In some implementations, rail 140 can be cylindrical in shape. Alternatively, rail 140 can be rectangular in shape or can be solid or hollow. In some implementations, rail 142 can be made of any material known in the art, including, but not limited to, plastic, metal, aluminum, wood, etc.

In some implementations, hard drive frame 104 comprises a frame adapted to house a hard drive such that the hard drive is framed on its edges and exposed on its sides. For example, hard drive frame 104 can be adapted to easily allow a hard drive to slip in and be secured, while hard drive couplings (e.g. male and female couplings) remain exposed. In some implementations, hard drive frame 104 comprises three sides, each side comprising a securing means. For example, securing means can be any securing means known in the art, including, but not limited to, clamps, prongs, friction fit, snap fit, screws, etc. Alternatively, hard drive frame 104 can be sized to fit hard drive 136 exactly, or can be bigger than hard drive 136.

In some implementations, hard drive frame 104 houses hard drive 136 in a vertically-oriented position. For example, hard drive 136 is oriented such that it is longer than it is high, and higher than it is wide, as depicted in FIG. 1. In some implementations, handle 102 is attached to at top of hard drive frame 104. In some implementations, hard drive 136 is a standard hard drive known in the art, including, but not limited to, hard disk drives (HDDs), flash drives, solid state drives, etc.

In some implementations, hard drive carrier 100, including handle 102, and hard drive frame 104, can be made of any material known in the art, including, but not limited to, plastic, metal, aluminum, wood, etc.

Figure 2:
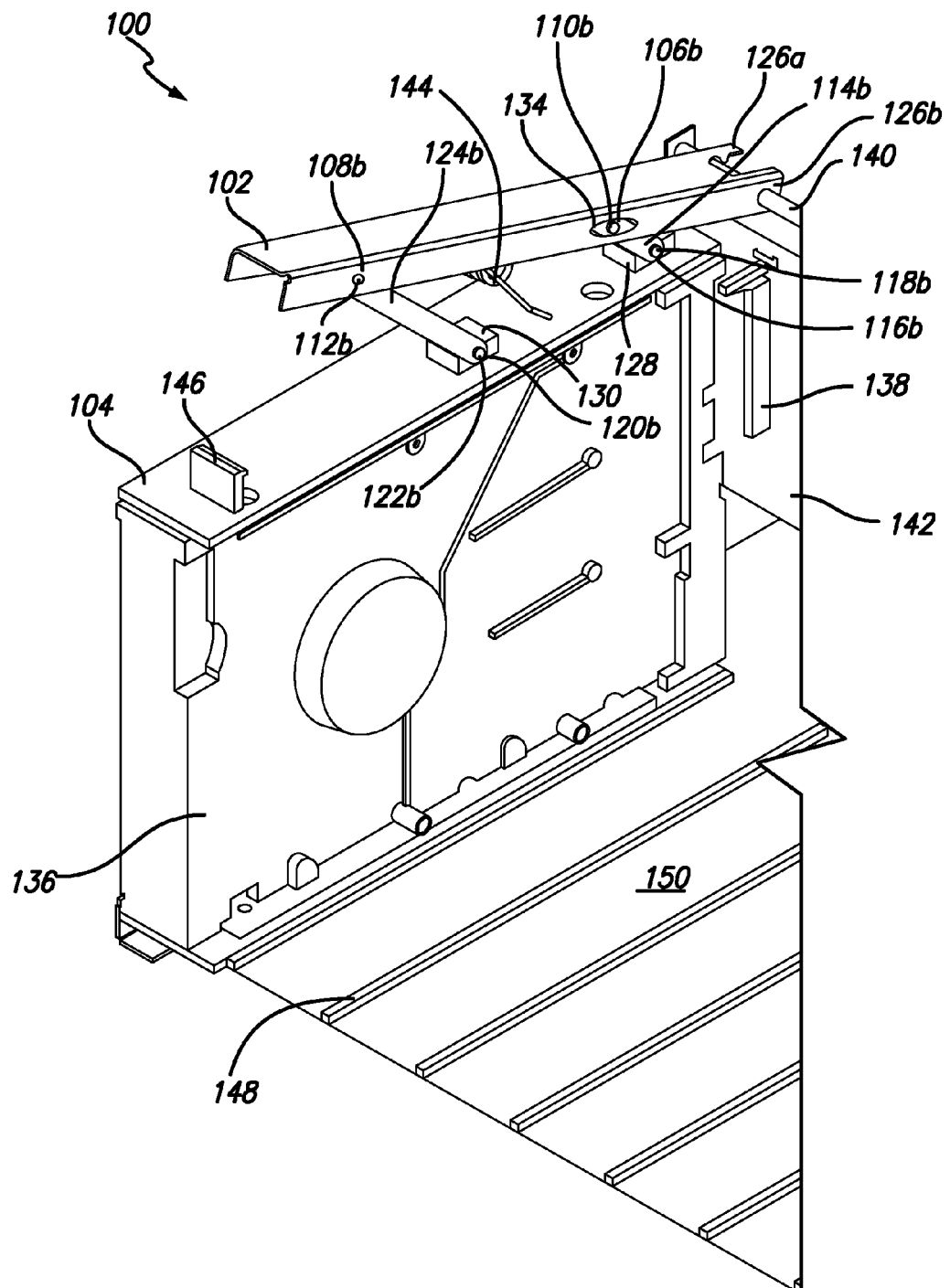
FIG. 2 is an alternate view of the apparatus of FIG. 1 showing the hard drive carrier attached to a rail.

FIGS. 2 and 3 illustrate the motion of hard drive carrier 100 as hooks 126*a* and 126*b* engage with rail 140 and handle 102 pivots down towards hard drive frame 104 while hard drive 136 slides horizontally towards coupling 138. In some implementations, once hooks 126*a* and 126*b* removably engage with rail 140, handle 102 is in a raised position with respect to hard drive frame 104. Additionally, hard drive 136 can be aligned with a hard drive coupling located on chassis 142 such that a male or female hard drive coupling on hard drive 136 is in line with coupling 138 on chassis 142.

In some implementations, as handle 102 is pushed down from a vertical direction, it causes hard drive 136 to be moved horizontally towards chassis 142. As handle 102 is pushed down, hard drive 136 is coupled with coupling 138. In some implementations, handle 102 moves in a pivoting motion vertically down towards the top of hard drive frame 104 as hard drive 136 moves in a horizontal direction towards coupling 138. Once handle 102 is lying flat against the top of hard drive frame 104, hard drive 136 is completely coupled with coupling 138 on chassis 142.

In some implementations, as handle 102 pivots down towards hard drive frame 104, first pivot joints 110*a* and 110*b* slide causing first pivot points 106*a* and 106*b* to move along windows 132 and 134 from one end to another end. Second, third, and fourth pivot points and joints 108*a*, 108*b*, 116*a*, 116*b*, 120*a*, 120*b*, 112*a*, 112*b*, 118*a*, 118*b*, 122*a*, and 122*b* remain fixed in place as handle 102 pivots down. In some implementations pivot bars 114*a*, 114*b*, 124*a*, and 124*b* pivot down towards hard drive frame 104 as handle 102 pivots down towards hard drive frame 104.

Alternatively, as handle 102 is pivoted up and away from hard drive frame 104, hard drive 136 slides horizontally away from chassis 142, causing hard drive 136 to decouple from coupling 138. As handle 102 is lifted, first pivot joints 110*a* and 110*b* slide along windows 132 and 134 causing first pivot points 106*a* and 106*b* to move back to their original location. Second, third, and fourth pivot points and joints 108*a*, 108*b*, 116*a*, 116*b*, 120*a*, 120*b*, 112*a*, 112*b*, 118*a*, 118*b*, 122*a*, and 122*b* remain fixed in place. Pivot bars 114*a*, 114*b*, 124*a*, and 124*b* pivot away from hard drive frame 104 as handle 102 pivots away hard drive frame 104. Once handle 102 is fully extended away from hard drive frame 104, hard drive 136 is fully decoupled from coupling 138, and hooks 126*a* and 126*b* can be disengaged from rail 140. Hard drive carrier 100 can now be fully removed, removing hard drive 136 from chassis 142. For example, hard drive carrier 100 can be removed from chassis 142 by being vertically lifted out of hard drive drawer 150 using handle 102.

In some implementations, elastic member 144 and lock 146 are used in combination to facilitate coupling and removal of hard drive 136. When being lowered into hard drive drawer 150, elastic member 144 ensures that handle 102 remains in a fixed position and does not move around. Elastic member 144 can be attached to hard drive frame 104 between first and second pivot boxes 128 and 130, and can be attached under handle 102 according to means known in the art. Elastic member 144 keeps handle 102 in an open position when no external force is applied to handle 102. When handle 102 is lowered to lie flat against the top of hard drive frame 104, lock 146 keeps handle 102 in place so that the force of elastic member 144 does not cause handle 102 to rotate upwards. When removing hard drive 136, handle 102 is limited from rotating past a certain point away from hard drive frame 104 by elastic member 144. As such, handle 102 can be used to tilt hard drive 136 after hard drive 136 is decoupled to facilitate removal of hard drive 136. Elastic member 144 can be any spring known in the art, including, but not limited to, torsion springs, compression springs, etc. Lock 146 can be any locking mechanism known in the art, including, but not limited to, latching designs and sliding designs.

In some implementations hard drive drawer 150 can comprise guiding structure 148 for aid in guiding and lining up hard drive 136 with coupling 138 as hard drive frame 104 slides toward chassis 142. Guiding structure 148 can comprise a raised portion of the bottom of hard drive drawer 150. Alternatively, guiding structure 148 can comprise segmented ribs or separated bumps.

Figure 4:
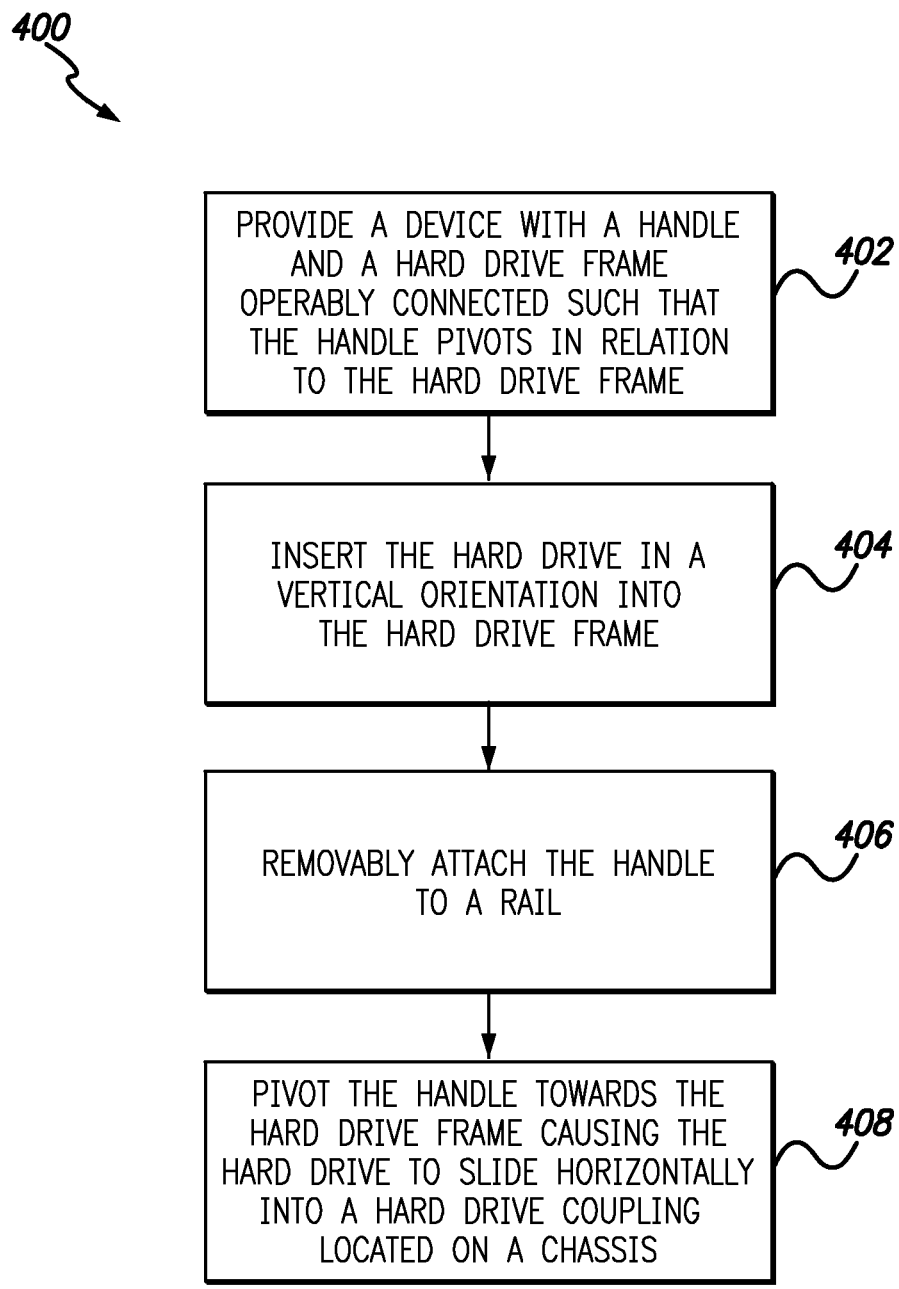
FIG. 4 is a flow diagram of an example method for horizontal coupling of a vertically-oriented hard drive.

Referring to FIG. 4 is a flow diagram 400 of an example method for horizontal coupling of a vertically-oriented hard drive. The method described below can be carried out using the configurations illustrated in FIGS. 1-3, for example, and various elements of these figures are referenced in explaining the example method. Each block shown in FIG. 4 represents one or more processes, methods or subroutines, carried out in the example method. Furthermore, the illustrated order of blocks is illustrative only and the order of the blocks can change according to the present disclosure. Additional blocks can be added or fewer blocks may be utilized, without departing from this disclosure. The example method begins at block 402.

At block 402, a device is provided with a handle and a hard drive frame operably connected such that the handle pivots in relation to the hard drive frame. The handle can be adapted to pivot in relation to the hard drive frame according to the disclosed structures above. The hard drive frame can be adapted to fit a hard drive according to the disclosed structures above.

At block 404, a hard drive is inserted in a vertical orientation into the hard drive frame. In some implementations, the hard drive frame is adapted to house the hard drive in a vertical orientation.

At block 406, the handle is removably attached to a rail. In some implementations, the handle comprises hooks to facilitate removably attaching the handle to the rail. For example, the hooks can be two U-shaped recesses located on the handle, or other implementations as disclosed above.

At block 408, the handle is pivoted towards the hard drive frame causing the hard drive to slide horizontally into a hard drive coupling located on a chassis. The handle pivots down as the hard drive slides horizontally, according to the disclosure above. Once the handle is completely flat against the hard drive frame, the hard drive is completely coupled to the hard drive coupling, as described above.

In some implementations, reversing the above steps supports a method for decoupling the hard drive from the hard drive coupling. For example, lifting the handle decouples the hard drive from the hard drive coupling, followed by removing the handle from the rail, followed by removing the hard drive from the hard drive frame.

A number of implementations have been described. Nevertheless, it will be understood that various modifications may be made. For example, other steps may be provided, or steps may be eliminated, from the described methods, and other components may be added to, or removed from, the described systems. Accordingly, other implementations are within the scope of the following claims.

For clarity and simplicity, only one hard drive carrier 102 is described. However, multiple hard drive carriers housing multiple hard drives in vertical orientations can be supported by the above disclosure. For example, multiple hard drives can be coupled to multiple couplings side-by-side according to the disclosure herein.

Although a variety of examples and other information were used to explain aspects within the scope of the appended claims, no limitation of the claims should be implied based on particular features or arrangements in such examples, as one of ordinary skill would be able to use these examples to derive a wide variety of implementations. For example, the hard drive carrier can be used to house components other than hard drives, and can be adapted to facilitate coupling and removal of such components from a chassis according to the disclosure above. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. An apparatus comprising:
   a chassis comprising a rail and a component coupling;
   a drawer comprising a plurality of guiding structures;
   a frame housing a component and disposed between adjacent ones of the plurality of guiding structures;
   a handle having a first end removably and pivotably attached to the rail; and
   a pivot bar pivotably attaching the handle to the frame;
   wherein the pivot bar is configured for causing, when pivoting the handle down towards the frame in a first direction, the frame to slide in the drawer between the adjacent ones of the plurality of guiding structures in a second direction to couple the component to the component coupling, wherein the first direction is substantially orthogonal to the second direction.

2. The apparatus of claim 1, wherein the first end comprises at least one hook, wherein the at least one hook is removably attached to the rail and rotates about the rail when the handle is pivoted with respect to the frame.

3. The apparatus of claim 1, the frame further comprising a lock, wherein pivoting the handle down towards the frame further causing the handle to engage the lock on the frame.

4. The apparatus of claim 1 wherein the pivot bar is further configured for causing, when pivoting the handle away from the frame, the frame to slide in the drawer in a third direction opposite to the second direction and decouple the component from the chassis.

5. The apparatus of claim 1, further comprising a second pivot bar for the pivotally attaching the handle to the frame, wherein the second pivot bar is pivotally and slidably attached to the handle at a second pivot point.

6. The apparatus of claim 5, wherein the second pivot point comprises at least one window in the handle and a pivot joint extending in the at least one window, wherein the pivot joint rotates within the at least one window when the handle is pivoted.

\* \* \* \* \*